United States Patent
Bonsall et al.

Patent Number: 5,262,964
Date of Patent: Nov. 16, 1993

[54] METHOD AND APPARATUS FOR VARIABLE PLAYBACK SPEED OF MULTIMEDIA DATA INTERCHANGE WITHIN A DATA PROCESSING SYSTEM

[75] Inventors: Gordon W. Bonsall, Winchester; Antony G. Cripps, Dibden, both of England; Robert A. Pascoe, Grapevine; Charles L. Peek, Austin, both of Tex.

[73] Assignee: International Business Machines Corporation, Armonk, N.Y.

[21] Appl. No.: 683,383

[22] Filed: Apr. 10, 1991

[51] Int. Cl.⁵ .......................... G09B 5/06; H04N 7/00; H04N 5/00
[52] U.S. Cl. .................................... 364/514; 358/133; 358/181; 370/94.2; 375/25
[58] Field of Search .............. 364/514; 358/133, 181, 358/183; 395/200; 370/94.2; 375/25

[56] References Cited

U.S. PATENT DOCUMENTS

| | | | |
|---|---|---|---|
| 4,771,391 | 9/1988 | Blasbalg | 364/514 |
| 4,868,653 | 9/1989 | Golin et al. | 358/133 |
| 4,918,523 | 4/1990 | Simon et al. | 358/133 |
| 5,010,401 | 4/1991 | Murakami et al. | 358/133 |
| 5,032,927 | 7/1991 | Watanabe et al. | 358/133 |
| 5,036,391 | 7/1991 | Auvray et al. | 358/133 |
| 5,045,940 | 9/1991 | Peters et al. | 364/514 |

Primary Examiner—Jack B. Harvey
Assistant Examiner—Jae H. Choi
Attorney, Agent, or Firm—Andrew J. Dillon

[57] ABSTRACT

The method and apparatus may be utilized for the efficient interchange of multimedia data in a data processing system. A sequential data stream is established which includes multiple variable length consecutive sections, each of which includes multiple data samples. Each data sample preferably includes a collection of data and a control structure or header which is utilized to specify a manner of interpreting the collection of data. In the depicted embodiment of the present invention a track collection index is transmitted in conjunction with the sequential data stream and utilized to identify the physical location of various track samples within the data stream. Additionally, a track sequence index is provided which may be utilized to identify the logical order in which the data samples are to be utilized in each selected track to create a multi-media presentation along with an indication of the playback speed to be utilized. This sequential data stream, track collection index and track sequence index are then transmitted throughout a distributed data processing system utilizing various personal computers or intelligent work stations, permitting multimedia data to be efficiently interchanged.

13 Claims, 4 Drawing Sheets

|COLINDX1|
|COLINDX2|
.
.
|COLINDXn|
|SEQINDX1|
|SEQINDX2|

|SEQINDXn|
|PHDR|
    |SHDR1|
        |THDR11|
            |CHDR111|data|CTRL111|...|CHDR11i|data|CTRL11i|
        |TTRL11|

|THDR12|
            |CHDR121|data|CTRL121|...|CHDR12j|data|CTRL12j|
        |TTRL12|
        .
        .
        |THDR1k|
            |CHDR1k1|data|CTRL1k1|...|CHDR1km|data|CTRL1km|
        |TTRL1k|
    |STRL1|

|SHDR2|
        |THDR21|
            |CHDR211|data|CTRL211|...|CHDR21n|data|CTRL21n|
        |TTRL21|

|THDR22|
            |CHDR221|data|CTRL221|...|CHDR22p|data|CTRL22p|
        |TTRL22|
        .
        .
        |THDR2k|
            |CHDR2k1|data|CTRL2k1|...|CHDR2kq|data|CTRL2kq|
        |TTRL2k|
    |STRL2|
    .
    .
    |SHDRr|
        |THDRr1|
            |CHDRr11|data|CTRLr11|...|CHDRr1s|data|CTRLr1s|
        |TTRLr1|
    |STRLr|
•|PTLR|

*Fig. 4*

METHOD AND APPARATUS FOR VARIABLE PLAYBACK SPEED OF MULTIMEDIA DATA INTERCHANGE WITHIN A DATA PROCESSING SYSTEM

CROSS-REFERENCE TO RELATED APPLICATION

The present application is related to U.S. patent application Ser. No. 07/683,382, entitled "Method and Apparatus for Multimedia Data Interchange in a Data Processing System," and U.S. patent application Ser. No. 07/683,353, entitled "Method and Apparatus for Nonsequential of Multimedia Data Interchange In a Data Processing System," both filed of even date herewith by the inventors hereof and assigned to the assignee herein.

BACKGROUND OF THE INVENTION

1. Technical Field

The present invention relates in general to improved data processing systems and in particular to improved methods for interchanging data within a data processing system. Still more particularly, the present invention relates to a method and apparatus for the efficient interchange of multimedia data with variable playback speeds in a data processing system.

2. Description of the Related Art

The interchange of data within a data processing system is a well known feature of modern state-of-the-art computer systems. Text and graphics may be efficiently interchanged between data processing facilities utilizing well known modem devices or facsimile devices/cards.

Recently, modern computer systems have begun to experiment in so-called "multimedia" data. That is, presentations containing audio, video, text, graphics and image combined into a common presentation. One factor which complicates the assemblage and manipulation of multimedia data is that such data may take several forms. For example, audio data may be stored and interchanged as analog data, such as audio tape and AM or FM radio signals.

Additionally, audio data may be stored and interchanged as coded data, which includes coded values for factors such as tone, duration, loudness, etc. One example of coded audio data is the so-called Musical Instrument Digital Interface (MIDI), in which keystrokes are encoded and exchanged utilizing a common interface. Finally, audio data may be stored and interchanged as uncoded data, or data which simply represents a digital representation of an audio signal, such as the signal encoded on a compact audio disk.

The variety of forms which audio data may take has lead to great difficultly when attempting to interchange such data. This is particularly true when attempting to vary the playback speed of audio or video data. Thus, it should be apparent that a need exists for a method and apparatus which permits the efficient and accurate interchange of multimedia data with variable playback speeds in a data processing system.

SUMMARY OF THE INVENTION

It is therefore one object of the present invention to provide an improved data processing system.

It is another object of the present invention to provide an improved method for interchanging data within a data processing system.

It is yet another object of the present invention to provide a method and apparatus for permitting the efficient interchange of multimedia data within a data processing system.

The foregoing objects are achieved as is now described. The method and apparatus of the present invention may be utilized for the efficient interchange of multimedia data in a data processing system. A sequential data stream is established which includes multiple variable length consecutive sections, each of which includes multiple data samples. Each data sample preferably includes a collection of data and a control structure or header which is utilized to specify a manner of interpreting the collection of data. The control structure preferably includes information regarding the size of the collection of data, the resolution and duration of the collection of data, the manner of data collection employed and the encoding technique utilized, if any. In the depicted embodiment of the present invention a track collection index is transmitted in conjunction with the sequential data stream and utilized to identify the physical location of various track samples Within the data stream. Additionally, a track sequence index is provided which may be utilized to identify the logical order in which the data samples are to be utilized in each selected track to create a multi-media presentation along with an indication of the playback speed to be utilized. This sequential data stream, track collection index and track sequence index are then transmitted throughout a distributed data processing system utilizing various personal computers or intelligent work stations, permitting multimedia data to be efficiently interchanged.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a textual representation of a generalized multi-track structure which may be interchanged utilizing the sequential data stream of the present invention.

DETAILED DESCRIPTION OF PREFERRED EMBODIMENT

Figure 1:
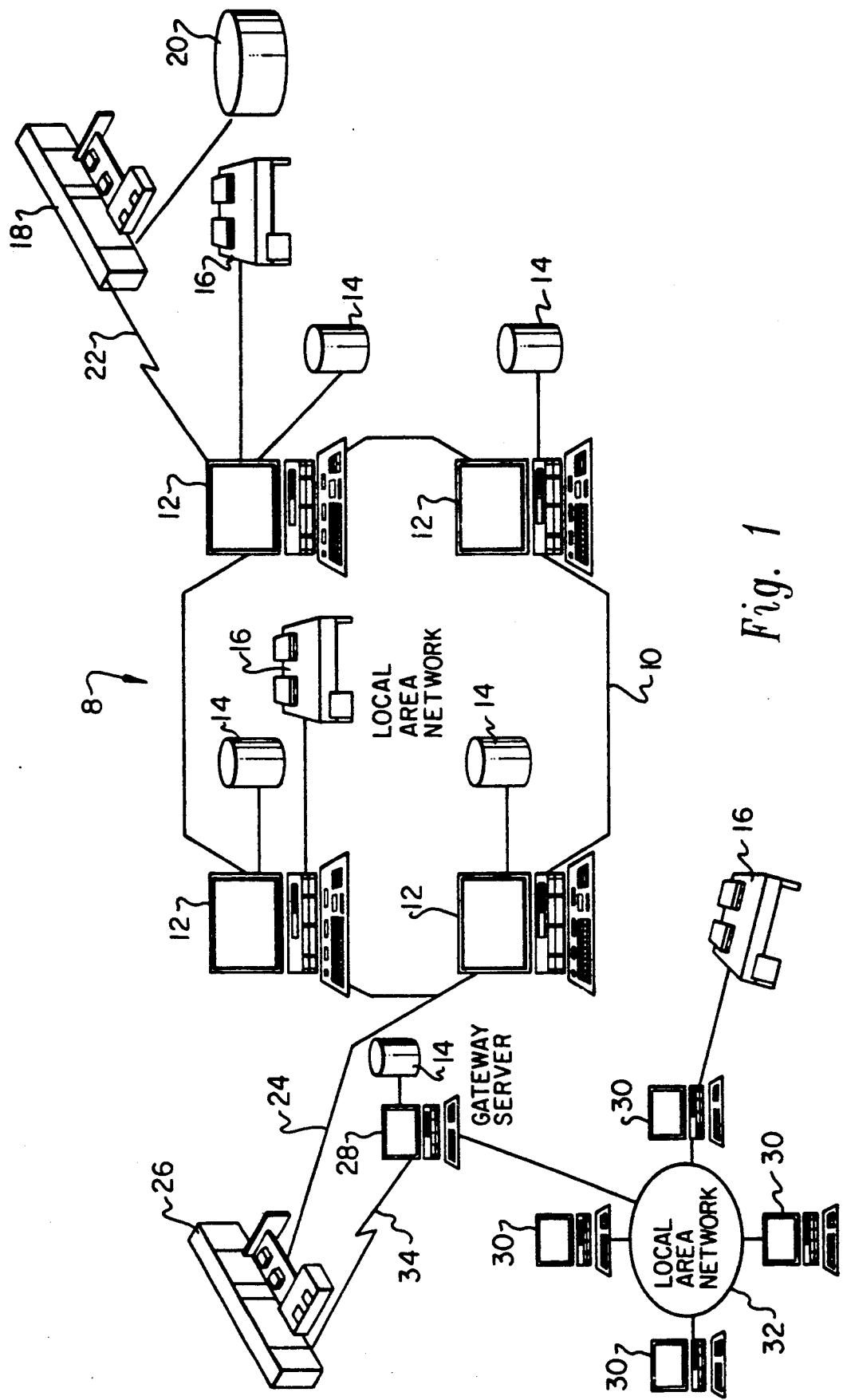
FIG. 1 is a pictorial representation of a distributed data processing system which may be utilized to implement the method of the present invention.

With reference now to the figures and in particular with reference to FIG. 1, there is depicted a pictorial representation of a distributed data processing system 8 which may be utilized to implement the method of the present invention. As may be seen, data processing system s may include a plurality of networks, such as Local Area Network (LAN) 10 and 32, each of which preferably includes a plurality of individual computers 12 and 30, respectively. Of course, those skilled in the art Will appreciate that a plurality of Intelligent Work Stations (IWS) coupled to a host processor may be utilized for each such network. As is common in such data processing systems, each individual computer may be coupled to a storage device 14 and/or a printer/output device 16. One or more such storage devices 14 may be utilized, in accordance with the method of the present invention, to store the various files containing multimedia data which may be periodically accessed, processed and interchanged by a user within data processing system 8 in accordance with the method of the present invention. In a manner well known in the prior art, each file containing multimedia data may be stored within a storage device 14 which is associated with a Resource Manager or Library Service, which is responsible for maintaining and updating all files associated therewith.

Still referring to FIG. 1, it may be seen that data processing network s also includes multiple central computer systems, such as central computer system 18, Which may be preferably coupled to Local Area Network (LAN) 10 by means of communications link 22. In one embodiment of the present invention, central computer system 18 may be an IBM System/370, although other computer systems, such as an IBM Application System/400 or PS/2 could also be utilized. In addition, central computer system 18 may not be necessary if one or more Local Area Networks (LAN) are sufficient to connect all desired users.

Central computer system 18 may also be coupled to a storage device 20 which may also serve as remote storage for Local Area Network (LAN) Similarly, Local Area Network (LAN) 10 may be coupled via communications link 24 through a subsystem control unit/communications controller 26 and communications link 34 to gateway server 28. Gateway server 28 is preferably an individual computer or Intelligent Work Station (IWS) which serves to link Local Area Network (LAN) 32 to Local Area Network (LAN) such that electronic messages may be easily transmitted and received between individuals within either network containing multimedia data in accordance with the method of the present invention.

As discussed above with respect to Local Area Network (LAN) 32 and Local Area Network (LAN) 10, a plurality of files may be stored within storage device 20 and controlled by central computer system 18, as Resource Manager or Library Service for the files thus stored. Of course, those skilled in the art will appreciate that central computer system 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network s to be able to create or select certain files containing multimedia data for transfer to other users within data processing network 8. This is generally accomplished in the prior art by separately transmitting various audio, video, graphic, image or text files and then assembling those files into a multimedia presentation at the end user's site. Therefore, it should be apparent that a need exists for a method whereby multimedia data files may be interchanged efficiently within a distributed data processing network such as data processing network 8.

Figure 2:
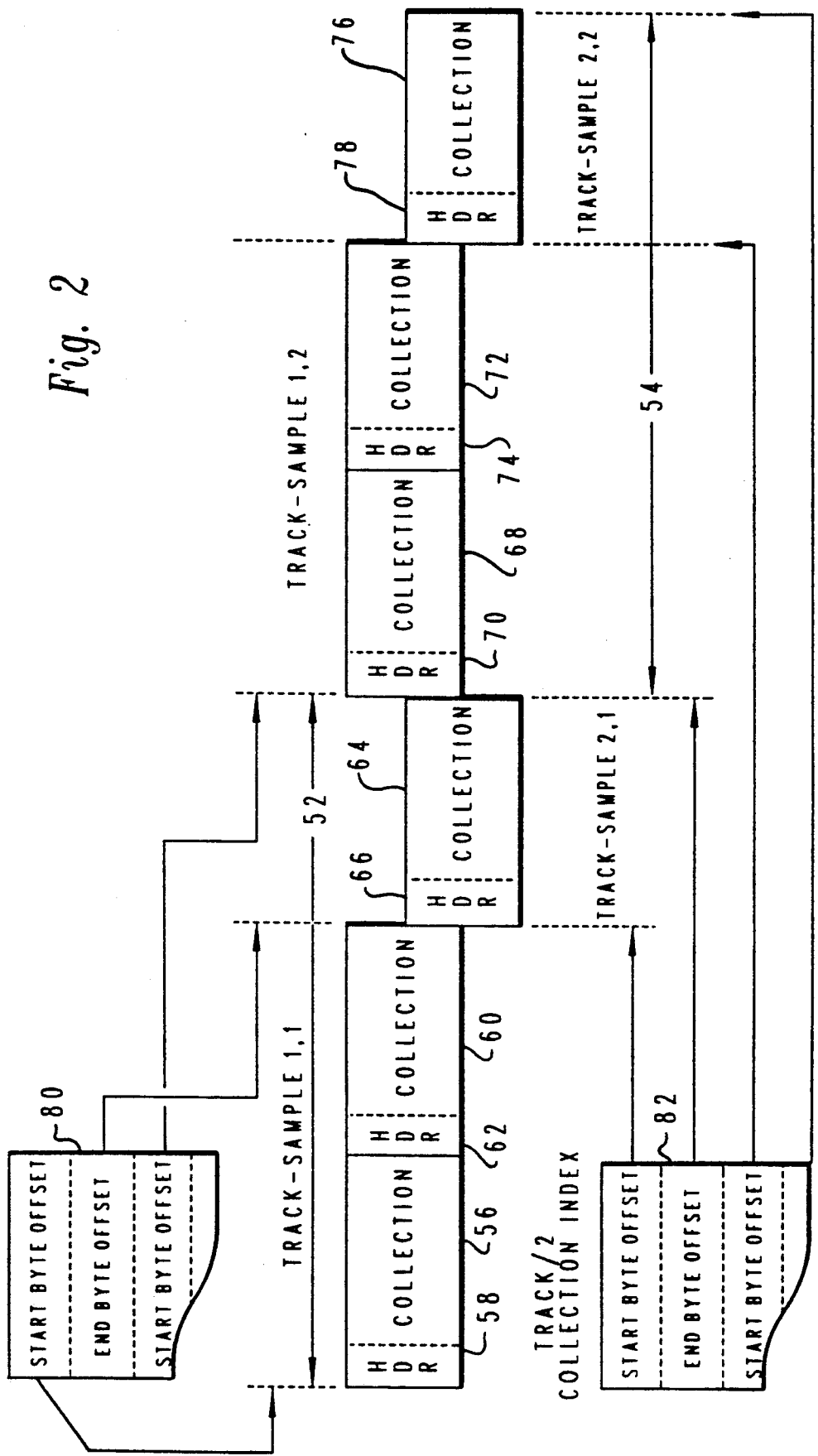
FIG. 2 is a pictorial representation of a sequential data stream which may be utilized to implement the method of the present invention.

Referring now to FIG. 2, there is depicted a pictorial representation of a sequential data stream 50 which may be utilized to implement the method of the present invention. As is illustrated, the pictorial representation of sequential data stream 50 includes various sections which have been shifted for ease of illustration. In accordance with an important feature of the present invention sequential data stream 50 includes a plurality of variable length consecutive sections such as section 52 and section 54. Each section within sequential data stream 50 then includes a plurality of multimedia data samples which may, utilizing terminology well known in the multimedia art, be divided into a plurality of "tracks."

As illustrated in FIG. 2, section 52 preferably includes a single sample for two different tracks. That is, track one, sample one includes a collection of data 56 along with a control structure or "header" 58. Header 58 preferably includes information regarding the size of data collection 56, the resolution and duration of data collection 56, the manner of data collection which was employed to create data collection 56 and the encoding technique utilized, if any, to create data collection 56. Similarly, data collection 60 is included along with an associated control structure or header 62. Section 52 also preferably includes a first sample for a second track, that is, data collection 64 and its associated control structure or header 66. Although the depicted embodiment discloses two tracks of multimedia data the present invention may be implemented utilizing any number of tracks and any number of header/data collection pairs within each track. In this manner, multimedia data may be variably formatted at any specified level such that section 52 may include collections of video frame data along with close captioning which is to be associated with that video data. Similarly, stereo music may be encoded utilizing the method of the present invention by transmitting coded or non-coded musical data in two separate tracks along with a video track to provide a video image to be associated with the music.

Still referring to FIG. 2, section 54 of sequential data stream 50 is also illustrated. As above, section 54 includes a plurality of data collections 68, 72, and 76 along with various control structures 70, 74 and 78 which may be utilized by the receiving user to control the manner of interpreting the collection of data contained therein. In this manner, the method of the present invention defines a single consistent data format which may be utilized at multiple levels which is sufficiently flexible to permit either variable formatting at a specified level to handle closed captioning of certain video frames or to enforce fixed length sections to permit optimization for restricted data rate devices.

An important feature of the present invention is also illustrated in FIG. 2. Specifically, track 1 collection index 80 and track 2 collection index 82 are depicted pictorially in conjunction with sequential data stream 50. Each track Collection index depicted may be utilized, in the manner described herein, to identify the physical location of various track samples within sequential data stream 50. That is, track 1 collection index so includes a listing of the start byte offset and end byte offset from the beginning of sequential data stream 50 for each data sample within track 1. Similarly, track 2 collection index 82 includes a like listing of the beginning byte offset and end byte offset for each data sample within track 2. Thus, by transmitting a track collection index for each track within sequential data stream 50 in conjunction with sequential data stream 50 a recipient may readily determine the physical of each data sample within sequential data stream 50.

Figure 3:
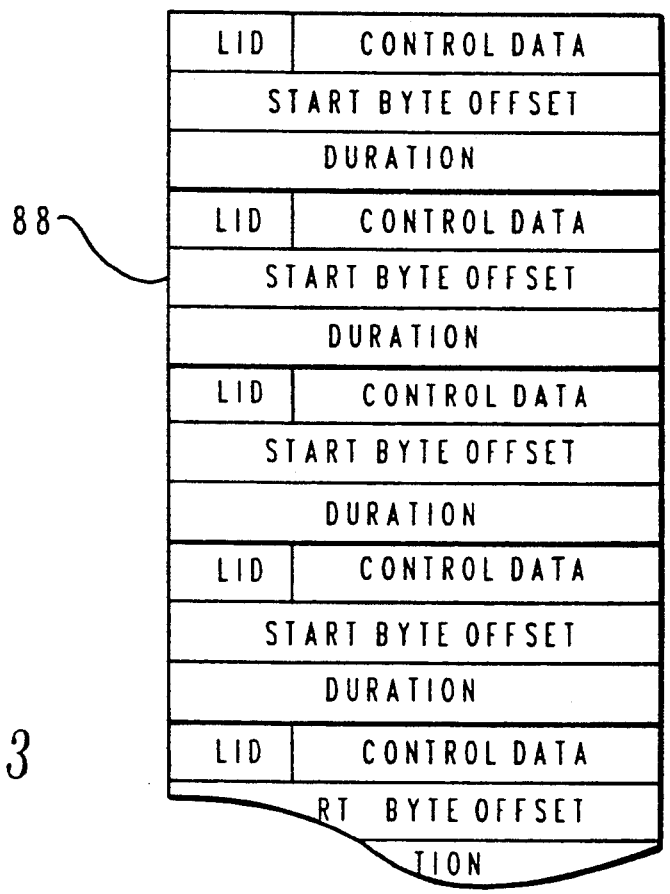
FIG. 3 is a pictorial representation of a track sequence index which may be utilized to implement the method of the present invention.

With reference now to FIG. 3, there is depicted a pictorial representation of a track sequence index which may be utilized to implement the method of the present invention. As illustrated, track sequence index 88 includes multiple fields for each of a sequential listing of various samples, each identified by a Local ID (LID) and each including optional control data information, such as information permitting the sequence of samples to iterate or loop, a silence bit indicating that this particular sample should be provided by utilizing the system generated sample which is specified for silent conditions or signal generation data which may be utilized to notify the system when processing of this particular sample has terminated.

In accordance with another important feature of the present invention, the optional control data information contained within track sequence index 88 may be utilized to define a playback speed value which may be stored therein in a listing of an identified sample and utilized thereafter to specify the speed at which the data is to be played back by the retrieving process or application. Existing audio and video interchange data formats always assume that all devices which process audio or video data run at the same speed. This speed is assumed to be identical for both the record and playback process. Audio or video data descriptions are binarily encoded representations of temporally based events. Each digital value represents the strength of the audio signal or characterization of the video signal at a particular instance in time. While encoding schemes are utilized which provide for reproduction quality and data compression it is sometimes desirable to alter the playback speed at which an audio or video signal is to be reproduced. By adding a specified playback speed value within the optional control data information contained within track sequence index 88 the format of the presentation which may be achieved utilizing the sequential data stream is no longer dependent upon the internal clocking or timing mechanisms which are built into the various audio or video devices which are utilized to process that data. The value of the playback speed specified within the optional control data information of track sequence index 88 may be utilized to dictate the speed at which the audio is to be played, rather than merely duplicating the speed at which the audio or video data was recorded. This method provides a distinct advantage over prior systems in that devices with different internal clocking or timing mechanisms may all be utilized to recreate audio or video data at a desired speed. Further, the playback speed of a presentation utilizing the method of the present invention may be altered simply by changing the value of the playback speed contained within the optional control data information within track sequence index 88 without the necessity of changing the format of the source data.

Additionally, track sequence index 88 includes an identification of the start byte offset for each sample, as well as the duration of the sample desired. The listing of the duration of the sample desired is an important feature of the present invention since this listing enables a user to specify a shorter duration than the previously existent total sample length. For example, a user may include a two second sample digitized sound effect of an explosion within a sequential data stream and later specify a one second duration of that sound effect for utilization at a selected time within a multimedia presentation.

Thus, by permitting the user to specify selected durations for samples within track sequence index 88, as well as the playback speed and logical sequence in which the samples will be utilized in a presentation, the method of the present invention permits greater flexibility in creating a desired multimedia presentation without requiring each sample to be transmitted in strict sequential presentation format. By including a track sequence index for each track within the multimedia data stream, the method of the present invention provides a technique whereby a single multimedia data stream may be utilized nonsequentially to create different presentations, by merely varying the data within the track sequence index associated with that data stream.

Referring now to FIG. 4, there is depicted a textual representation of a generalized multi-track structure which may be interchanged utilizing the sequential data stream of FIG. 2. As illustrated, the textual representation begins with a listing of multiple track collection indices (COLINDX.1-COLINDX.n) and multiple track sequence indices (SEQINDX.1-SEXINOX.n) which as described above, may be utilized to identify both the physical location of each sample within a data stream and the logical sequence of samples to be utilized during presentation.

Next, a presentation header (PHDR) which identifies the presentation which is associated with the multimedia data structure to be transferred utilizing the sequential data stream of the present invention. Next, a section header (SHDR) is included which identifies the section of the sequential data stream which follows. Thereafter, a track header (THDR) follows which includes thereafter a collection of data which may be compressed and/or encoded. The collection header (CHDR) precedes data and is followed by a collection trailer (CTRL) to whatever extent is necessary to transmit all data associated with the selected track. Thereafter, a track trailer (TTRL) is utilized to indicate the termination of a particular track within the first section.

The sequential data stream of the present invention permits any number of tracks to be included within a section of the sequential data stream prior to encountering a section trailer (STRL) indicating the end of a particular section of the sequential data stream. Those skilled in the art will appreciate that the number of tracks to be included is effectively limited only by the processing speed of the devices involved and the compression rate which may be accomplished to permit a large number of tracks to be transmitted in this manner.

Thereafter, a second section header (SHDR) is utilized to precede a second group of tracks which, in accordance with the method of the present invention, may be variable in length and in number of tracks. Thereafter, after all sections have been transmitted, a presentation trailer (PTLR) is utilized to indicate the termination of a presentation which is represented by the sequential data stream thus described.

Upon reference to the foregoing those skilled in the art will appreciate that the Applicants in the present application have provided a method whereby multimedia data may be efficiently interchanged within a data processing system by providing multiple tracks of multimedia data wherein each track is subdivided into data collections.

The data collection is the atomic structural element of this architecture and the content of each collection may be coded or non-coded data. For example, it may be text data, audio encoding, MIDI data, video encoding, image data, graphics data or control information. Each collection may have two optional control structures or headers, one header is defined by the architecture and a second header may be utilized which is data type and data encoding dependent. These headers provide information on the interpretation of the data content of the collection.

For example, the architected header for audio may contain sound power level readings and a frequency spectrum for the collection. The non-architected headings may contain encoding specific information, such as the internal structure of the collection, number of bits per encoded audio data element, etc. The collection may also have an optional trailer where the trailer may contain nothing but padding to fill out the collection to a standard size or the trailer may contain a pointer to the next collection or other information relevant to collection processing.

Further, by utilizing the track collection index structure and the track sequence index structure described herein, those skilled in the art will appreciate that the Applicants have created a method and apparatus whereby a multimedia data stream may be transmitted within a data processing system in a non-sequential manner and wherein the track sequence index may be utilized to create multiple multimedia presentations from a single multimedia data stream by selectively accessing certain track samples within that data stream which are located by means of the track collection index provided and by creating a presentation utilizing variable playback speeds, as indicated in the track sequence index.

Upon reference to the foregoing, those skilled in the art will appreciate that the Applicants in the present application have created a generalized multimedia object which may be utilized to efficiently and rapidly interchange multimedia data for variable speed playback within a distributed data processing system in a non-sequential manner despite variations in the level of encoding or complexity present in each separate media within the multimedia presentation.

While the invention has been particularly shown and described with reference to a preferred embodiment, it will be understood by those skilled in the art that various changes in form and detail may be made therein without departing from the spirit and scope of the invention.

We claim:

1. A method in a data processing system for interchanging multimedia data, at least a portion of which is encoded, said method comprising the steps of:
    establishing a sequential data stream;
    subdividing said sequential data stream into a plurality of consecutive sections;
    disposing within each of said plurality of consecutive sections a plurality of multimedia data samples, at least one multimedia data sample comprising a collection of data and a control structure for specifying a manner of interpreting said collection of data;
    creating a sequence index associated with said sequential data stream, said sequence index identifying a sequence order of said plurality of multimedia data samples to be utilized to create a selected presentation and an indication of a playback speed to be utilized for selected ones of said plurality of multimedia data samples; and
    transmitting said sequence index and said sequential data stream within said data processing system.

2. The method in a data processing system for interchanging multimedia data according to claim 1, wherein said step of subdividing said sequential data stream into a plurality of consecutive sections comprises the step of subdividing said sequential data stream into a plurality of variable length consecutive sections.

3. The method in a data processing system for interchanging multimedia data according to claim 1, wherein said step of disposing within each of said plurality of consecutive sections a plurality of multimedia data samples comprises the step of disposing a plurality of variable length multimedia data samples within each of said plurality of consecutive sections.

4. The method in a data processing system for interchanging multimedia data according to claim 1, wherein at least one of said plurality of multimedia data samples comprises an encoded video sample.

5. The method in a data processing system for interchanging multimedia data according to claim 1, wherein said control structure for specifying a manner of interpreting said collection of data comprises an identification of an encoding technique utilized with said collection of data.

6. The method in a data processing system for interchanging multimedia data according to claim further including the step of creating a collection index associated with said sequential data stream, said collection index identifying a location for each of said plurality of multimedia data samples within said data processing system.

7. The method in a data processing system for interchanging multimedia data according to claim 3, wherein said step of creating a sequence index identifying a sequence order of said plurality of multimedia data samples to be utilized to create a selected presentation comprises the step of identifying a start location and an end location for each of said plurality of variable length multimedia data samples.

8. The method in a data processing system for interchanging multimedia data according to claim 3, at least one of said plurality of multimedia data samples comprises an encoded audio sample.

9. A data processing system for interchanging multimedia data, at least a portion of which is encoded, said data processing system comprising:
    means for creating a sequential data stream including a plurality of consecutive sections, each consecutive section including a plurality of multimedia data samples, at least one multimedia data sample comprising a collection of data and a control structure for specifying a manner of interpreting said collection of data;
    means for creating a sequence index associated with said sequential data stream, said sequence index identifying a sequence order of said plurality of multimedia data samples to be utilized to create a selected presentation and an indication of a playback speed to be utilized for selected ones of said plurality of multimedia data samples; and means for transmitting said sequence index and said sequential data stream within said data processing system.

10. The data processing system for interchanging multimedia data according to claim 9, wherein said plurality of consecutive sections comprises a plurality of variable length consecutive sections.

11. The data processing system for interchanging multimedia data according to claim 9, wherein said plurality of multimedia data samples comprises a plurality of variable length multimedia data samples.

12. The data processing system for interchanging multimedia data according to claim 9, wherein said means for transmitting said sequential data stream within said data processing system comprises a personal computer.

13. The data processing system for interchanging multimedia data according to claim 9, further including means for creating a collection index associated with said sequential data stream, said collection index identifying a location for each of said plurality of multimedia data samples within said data processing system.

* * * * *

UNITED STATES PATENT AND TRADEMARK OFFICE
CERTIFICATE OF CORRECTION

PATENT NO. : 5,262,964

DATED : Nobember 16, 1993

INVENTOR(S) : Gordon W. Bonsall, et al.

It is certified that error appears in the above-identified patent and that said Letters Patent is hereby corrected as shown below:

Col. 2, line 66, change "s" to --8--.

Col. 3, line 2, change "Will" to --will--.

Col. 3, line 20, change "s" to --8--.

Col. 3, line 22, change "Which" to --which--.

Col. 3, line 33, after "(LAN)" insert --10--.

Col. 3, line 63, change "s" to --8--.

Signed and Sealed this

Twenty-eighth Day of June, 1994

*Attest:*

BRUCE LEHMAN

*Attesting Officer*  *Commissioner of Patents and Trademarks*